US011882293B2

(12) United States Patent
Ma et al.

(10) Patent No.: US 11,882,293 B2
(45) Date of Patent: *Jan. 23, 2024

(54) METHODS FOR INTRA PREDICTION, ENCODER AND DECODER

(71) Applicant: GUANGDONG OPPO MOBILE TELECOMMUNICATIONS CORP., LTD., Guangdong (CN)

(72) Inventors: Yanzhuo Ma, Dongguan (CN); Junyan Huo, Dongguan (CN); Shuai Wan, Dongguan (CN); Fuzheng Yang, Dongguan (CN); Ze Guo, Dongguan (CN); Xinwei Li, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/721,321

(22) Filed: Apr. 14, 2022

(65) Prior Publication Data

US 2022/0239929 A1 Jul. 28, 2022

Related U.S. Application Data

(63) Continuation of application No. 17/366,333, filed on Jul. 2, 2021, now Pat. No. 11,457,223, which is a
(Continued)

(51) Int. Cl.
*H04N 19/176* (2014.01)
*H04N 19/159* (2014.01)
(Continued)

(52) U.S. Cl.
CPC ......... *H04N 19/159* (2014.11); *H04N 19/105* (2014.11); *H04N 19/132* (2014.11); *H04N 19/176* (2014.11)

(58) Field of Classification Search
CPC .. H04N 19/159; H04N 19/105; H04N 19/132; H04N 19/176
See application file for complete search history.

(56) References Cited

U.S. PATENT DOCUMENTS

| | | | |
|---|---|---|---|
| 9,467,693 | B2 | 10/2016 | Leontaris |
| 2011/0235716 | A1 | 9/2011 | Tanaka |

(Continued)

FOREIGN PATENT DOCUMENTS

| | | |
|---|---|---|
| CN | 102197652 A | 9/2011 |
| CN | 102857750 A | 1/2013 |

(Continued)

OTHER PUBLICATIONS

First Office Action of the European application No. 19907071.5, dated Sep. 13, 2022. 7 pages.
(Continued)

*Primary Examiner* — Hesham K Abouzahra
(74) *Attorney, Agent, or Firm* — PERKINS COIE LLP

(57) ABSTRACT

A method for intra prediction includes: obtaining multiple previously reconstructed neighbouring blocks corresponding to a current processing block; determining prediction modes, that are signalled in a bitstream, corresponding to neighbouring blocks of the multiple previously reconstructed neighbouring blocks, to obtain multiple first prediction modes; if the multiple first prediction modes comprise at least two directional modes, taking directional modes comprised in the multiple first prediction modes as first prediction directions; performing, according to a preset operation rule, operation on multiple first prediction directions of the first prediction directions to obtain second prediction directions; obtaining a prediction mode set according to the second prediction directions and the multiple first prediction modes; and performing intra prediction
(Continued)

on the current processing block based on the prediction mode set.

15 Claims, 17 Drawing Sheets

Related U.S. Application Data continuation of application No. PCT/CN2019/070156, filed on Jan. 2, 2019.

(51) Int. Cl.
*H04N 19/105* (2014.01)
*H04N 19/132* (2014.01)

(56) References Cited

U.S. PATENT DOCUMENTS

| | | | |
|---|---|---|---|
| 2013/0128963 | A1 | 5/2013 | Leontaris |
| 2015/0010057 | A1 | 1/2015 | Amano et al. |
| 2017/0272745 | A1 | 9/2017 | Liu et al. |
| 2017/0353720 | A1 | 12/2017 | Mao |
| 2018/0255319 | A1* | 9/2018 | Thoreau ............... G06T 15/205 |
| 2018/0288408 | A1 | 10/2018 | Ikai et al. |
| 2019/0394461 | A1 | 12/2019 | Liu et al. |
| 2020/0275107 | A1 | 8/2020 | Choi et al. |
| 2020/0336739 | A1 | 10/2020 | Choi et al. |
| 2021/0243430 | A1 | 8/2021 | Galpin et al. |

FOREIGN PATENT DOCUMENTS

| | | | |
|---|---|---|---|
| CN | 104853192 | A | 8/2015 |
| CN | 105847806 | A | 8/2016 |
| CN | 107113438 | A | 8/2017 |
| CN | 108141609 | A | 6/2018 |
| EP | 3562158 | A1 | 10/2019 |
| EP | 3700202 | A1 | 8/2020 |
| WO | 2018026148 | A1 | 2/2018 |

OTHER PUBLICATIONS

First Office Action of the Chinese application No. 202110723898.5, dated Nov. 3, 2022. 18 pages with English translation.
Written Opinion of the International Search Authority in the international application No. PCT/CN2019/070156, dated Sep. 27, 2019.
First Office Action of the Indian application No. 202127031222, dated Mar. 7, 2022.
First Office Action of the U.S. Appl. No. 17/366,333, dated Oct. 29, 2021.
Notice of Allowance of the U.S. Appl. No. 17/366,333, dated Jan. 20, 2022.
Supplemental Notice of Allowance of the U.S. Appl. No. 17/366,333, dated Mar. 22, 2022.
Li (LGE) et al: "CE3-6.2.1: Extended MPM list", 12. JVET Meeting; Oct. 3, 2018-Oct. 12, 2018; Macao; (The Joint Video Exploration Team of ISO/IEC JTC1/SC29/WG11 and ITU-T SG.16), No. JVET-L0165, Nov. 8, 2018 (Nov. 8, 2018), XP030200069, sections 7.3.4.6, 8.2.2.3.
Joint Video Experts Team (JVET) of ITU-T SG 16 WP 3 and ISO/IEC JTC 1/SC 29/WG 11, Document: JVET-K1001-v7, 11th Meeting: Ljubljana, SI, Jul. 10-18, 2018, Title: Versatile Video Coding (Draft 2), Status: Output document approved by JVET, Purpose: Draft text of video coding specification, Author(s) or Contact(s): Benjamin Bross, Jianle Chen, Shan Liu, Source: Editors.
C-H Yao et al: Title: CE3-related: Chroma intra prediction simplification, 11. JVET Meeting; Jul. 11, 2018-Jul. 18, 2018; Ljubljana; (The Joint Video Exploration Team of ISO/IEC JTC1/SC29/WG11 and ITU-T SG.16), No. JVET-K0469, Jul. 10, 2018 (Jul. 10, 2018), XP030199374, the whole document.
Supplementary European Search Report in the European application No. 19907071.5, dated Dec. 1, 2021.
International Search Report in the international application No. PCT/CN2019/070156, dated Sep. 27, 2019.
First Office Action of the Japanese application No. 2021-538786, dated Feb. 14, 2023. 10 pages with English translation.
Second Office Action of the European application No. 19907071.5, dated Feb. 21, 2023. 8 pages.
First Office Action of the U.S. Appl. No. 17/721,276, dated Mar. 1, 2023. 50 pages.
Second Office Action of the Chinese application No. 202110723898.5, dated Mar. 29, 2023. 17 pages with English translation.
First Office Action of the U.S. Appl. No. 17/721,228, dated Feb. 16, 2023. 31 pages.
Notice of Rejection of the Japanese application No. 2021-538786, dated Aug. 15, 2023, 6 pages with English translation.
Notice of Allowance of the European application No. 19907071.5, dated Aug. 23, 2023, 101 pages.

\* cited by examiner

METHODS FOR INTRA PREDICTION, ENCODER AND DECODER

CROSS-REFERENCE TO RELATED APPLICATIONS

The application is a continuation of U.S. patent application Ser. No. 17/366,333 filed Jul. 2, 2021, which is a continuation application of PCT Application No. PCT/CN2019/070156 filed on Jan. 2, 2019, the disclosure of which is hereby incorporated by reference in its entity.

BACKGROUND

In Versatile Video Coding (VVC), when intra prediction is performed on a current processing block, an optimal prediction mode (i.e., a signalled prediction mode) of a prediction block (also referred to as a previously reconstructed block) that is spatially corresponding or neighbouring to the current processing block and on which intra prediction has been performed, a derived mode having an optimal direction of the previously reconstructed block and some fixed intra prediction modes are generally combined as a candidate prediction mode set of the current processing block, and intra prediction is performed on the current processing block based on multiple candidate prediction modes in the set. For luma blocks, if multiple candidate prediction modes in the set are selected to perform intra prediction on a current processing block, a smaller number of bits are used for representing the intra prediction mode of the current processing mode compared with a case where prediction modes outside the set are selected for intra prediction. For chroma blocks, only the candidate modes in the set can be used for performing intra prediction on a current processing block.

Currently, before intra prediction is performed on the current processing block, if a directional mode is included in the candidate prediction mode set, in order to obtain a more accurate intra prediction effect, a new candidate prediction direction is derived on the basis of a known candidate prediction direction by simply incrementing or decrementing an index number of the candidate prediction direction by 1, so that the new candidate prediction direction is used for subsequent intra prediction on the current processing block.

However, such a method for implementing construction of an intra prediction direction (i.e., construction of a new candidate prediction direction) by simply incrementing or decrementing the index number of the known candidate prediction direction by 1 still does not have sufficient accurate prediction effect in the process of performing the intra prediction.

SUMMARY

Embodiments of the present disclosure relate to the field of video coding techniques, and more particularly to, but are not limited to, methods for intra prediction, an encoder and a decoder.

The technical solutions of the embodiments of the present disclosure are implemented as follows.

A first aspect provides a method for intra prediction, applied to an encoder, the method including: obtaining multiple previously reconstructed neighbouring blocks corresponding to a current processing block; determining prediction modes, that are signalled in a bitstream, corresponding to neighbouring blocks of the multiple previously reconstructed neighbouring blocks, to obtain multiple first prediction modes; if the multiple first prediction modes comprise at least two directional modes, taking directional modes comprised in the multiple first prediction modes as first prediction directions; performing, according to a preset operation rule, operation on multiple first prediction directions of the first prediction directions to obtain second prediction directions; obtaining a prediction mode set according to the second prediction directions and the multiple first prediction modes; and performing intra prediction on the current processing block based on the prediction mode set.

A second aspect provides a method for intra prediction, applied to a decoder, the method including: obtaining multiple previously reconstructed neighbouring blocks corresponding to a current processing block; obtaining multiple first prediction modes according to prediction modes of neighbouring blocks of the multiple previously reconstructed neighbouring blocks; if the multiple first prediction modes comprise at least two directional modes, taking directional modes comprised in the multiple first prediction modes as first prediction directions; performing, according to a preset operation rule, operation on multiple first prediction directions of the first prediction directions to obtain second prediction directions; obtaining a prediction mode set according to the second prediction directions and the multiple first prediction modes; and performing intra prediction on the current processing block based on the prediction mode set.

A third aspect provides an comprising a memory and a processor, the memory storing instructions executable on the processor, where the processor, when executing the instructions, perform operations of: obtaining multiple previously reconstructed neighbouring blocks corresponding to a current processing block; determining prediction modes, that are signalled in a bitstream, corresponding to neighbouring blocks of the multiple previously reconstructed neighbouring blocks, to obtain multiple first prediction modes; if the multiple first prediction modes comprise at least two directional modes, taking directional modes comprised in the multiple first prediction modes as first prediction directions; performing, according to a preset operation rule, operation on multiple first prediction directions of the first prediction directions to obtain second prediction directions; obtaining a prediction mode set according to the second prediction directions and the multiple first prediction modes; and performing intra prediction on the current processing block based on the prediction mode set.

DETAILED DESCRIPTION

To facilitate understanding of the technical solutions of the embodiments of the present disclosure, four basic concepts of prediction coding, intra prediction, prediction direction, and luma intra prediction are first briefly described.

The main function of the prediction coding is to construct a prediction value of a current processing block by using a spatially or temporally existing reconstructed picture in the video coding, and to transmit only a difference between the original value and the prediction value, so as to reduce the amount of transmitted data.

Figure 1A:
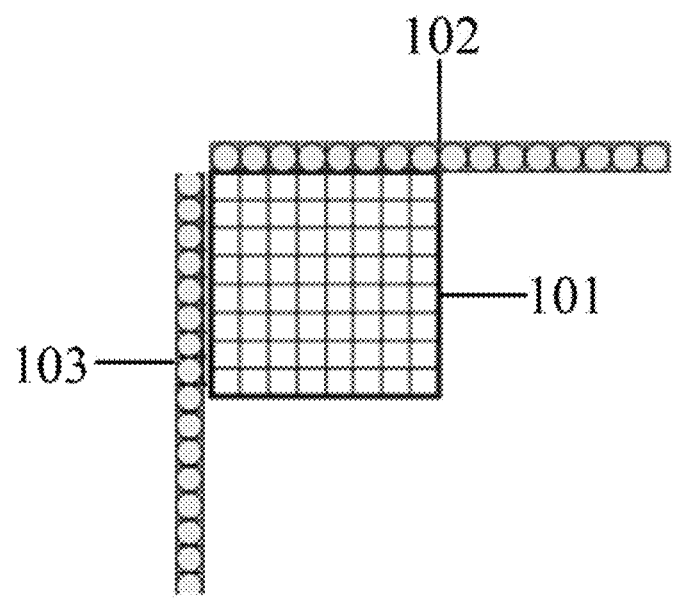
FIG. 1A is a schematic diagram of an intra prediction principle according to an embodiment of the present disclosure.

The main function of the intra prediction is to construct a prediction value of a current processing block by using samples of a previous row and a left column neighbouring to the current processing block. As shown in FIG. 1A, each sample of the current processing block 101 is predicted using neighboring pixels (i.e., samples in the previous row 102 and the left column 103 neighbouring to the current processing block) that have been restored and that are around the current processing block 101.

For example, the current processing block is a luma block, and when a prediction value of the current luma block is constructed by using the neighboring pixels, a plurality of prediction directions are used to sequentially predict the current luma block to obtain a luma prediction value matrix corresponding to each prediction direction; based on each luma prediction value matrix and an original value matrix of the current luma block, a difference matrix corresponding to each prediction direction is determined; based on each difference matrix, an evaluation parameter value corresponding to the prediction direction is determined, where the evaluation parameter value is used to represent a prediction effect of the corresponding prediction direction for the current luma block; based on each evaluation parameter value, a target prediction direction is determined from the plurality of prediction directions, for example, a prediction direction in which a minimum number of picture encoding bits can be obtained on the premise of ensuring video recovery quality is determined as the target prediction direction; and then the target prediction direction is signalled. It should be noted that there are 67 intra prediction directions supported by VVC, and the intra prediction directions with the index numbers 2-66 are shown in FIG. 1B.

Figure 1B:
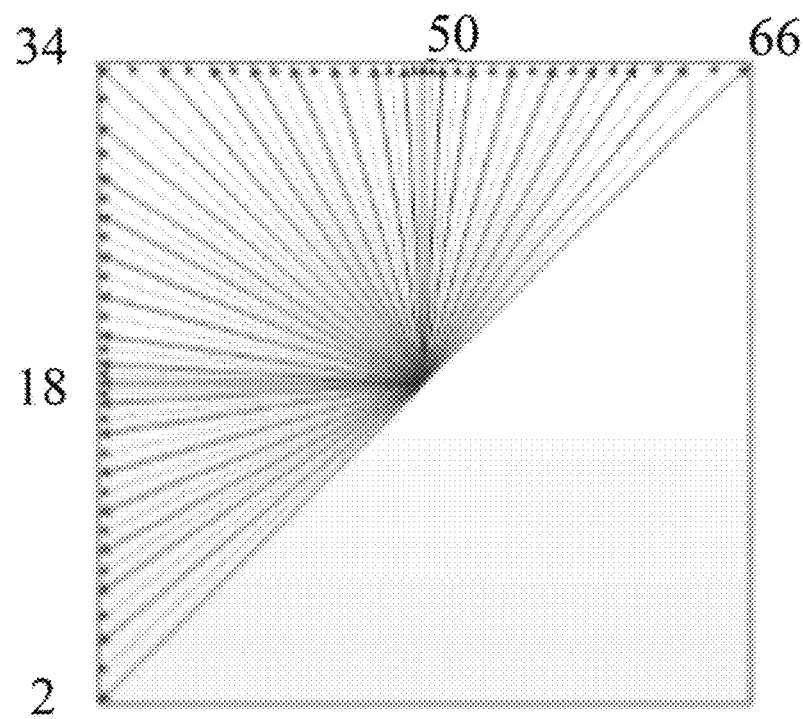
FIG. 1B is a schematic diagram of 67 intra prediction directions supported by Versatile Video Coding (VVC) in an embodiment of the present disclosure.
Figure 1C:
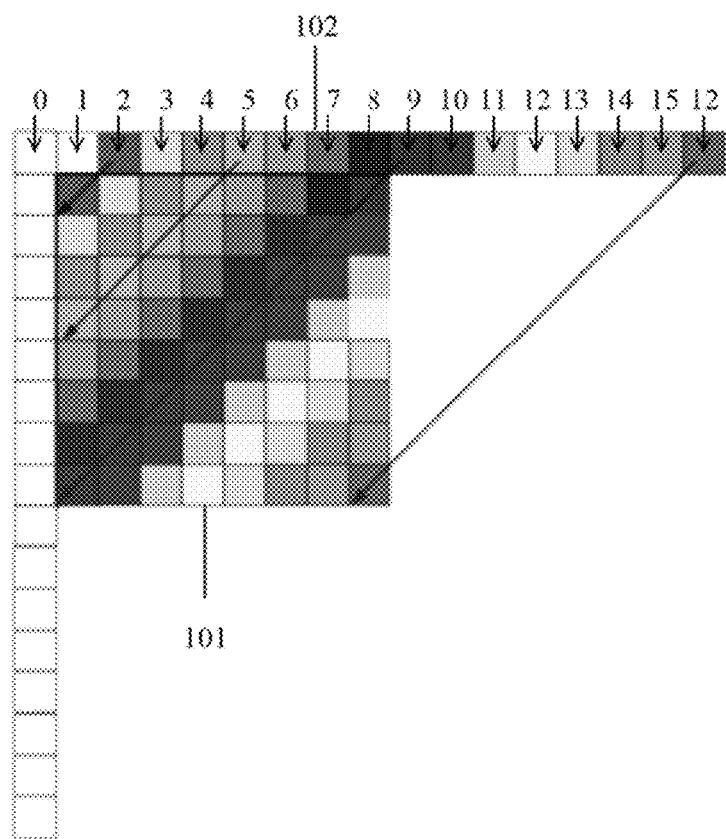
FIG. 1C is a schematic diagram of a prediction process of an intra prediction direction with an index number 66 according to an embodiment of the present disclosure.

Taking the intra prediction direction with the index number 66 as an example, as shown in FIG. 1C, a method of constructing a luma prediction value of each sample of the current luma block 101 is given. Data in a previous row 102 neighbouring to the current luma block 101 are previously reconstructed blocks. Each sample of the current luma block 101 is filled with a value of the sample along the upper right diagonal (i.e., the prediction direction with the index number 66).

In addition to the above-described manner for construction of a prediction block corresponding to FIG. 1C, there are two relatively flat manners for construction of a prediction block, namely, the direct current (DC) mode and the planar mode. In the DC mode, the entire current processing block is filled with an average of characteristic values (e.g., chroma values or luma values) of the previous row or the left column, and in the planar mode, the current processing block is filled in a gradual manner.

For the luma mode, prediction is performed sequentially according to various modes in FIG. 1B, a prediction mode that best matches the current luma block (for example, a sum of differences of difference matrices is minimum, or the rate distortion cost is minimum) is selected as the target prediction mode, the luma prediction value of each sample of the current luma block is constructed, and a difference value between the luma prediction value of each sample and the corresponding luma original value is determined. After the difference value corresponding to each sample corresponding to the target prediction mode and the target prediction mode are obtained, an encoding end signals the difference value corresponding to each sample and an index number of the target prediction direction corresponding to the current processing block into the bitstream. After receiving the bitstream, the decoding end parses the received bitstream to obtain the index number of the target prediction direction, and then calculates the luma prediction value of each sample in the corresponding current processing block, and adds the luma prediction value to the difference value obtained by parsing the bitstream to obtain a luma reconstruction value of the corresponding sample.

Figure 2A:
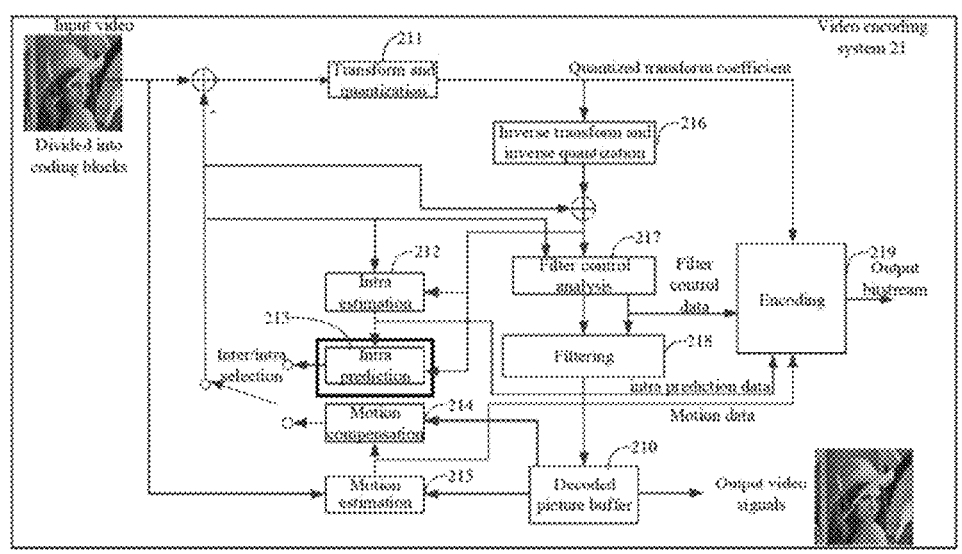
FIG. 2A is a schematic structural diagram of a video coding system according to an embodiment of the present disclosure.

On the basis of the above several basic concepts, an embodiment of the present disclosure provides a video encoding system. FIG. 2A is a schematic structural diagram of a composition of a video encoding system according to an embodiment of the present disclosure. As shown in FIG. 2A, the video encoding system 21 includes:

a transform and quantization unit 211, an intra prediction unit 212, an intra prediction unit 213, a motion compensation unit 214, a motion estimation unit 215, an inverse transform and inverse quantization unit 216, a filter control analysis unit 217, a filtering unit 218, an entropy coding unit 219, and a decoded picture buffer unit 210. A video reconstruction block can be obtained by dividing an input original video signal into Coding Tree Units (CTUs); and then the residual pixel information obtained after intra or inter prediction is transformed by the transform and quantization unit 211, including transforming the residual information from a pixel domain to a transform domain and quantizing a resulting transform coefficient to further reduce the bit rate. The intra estimation unit 212 and the intra prediction unit 213 are configured to perform intra prediction on the video reconstruction block, where the intra estimation unit 212 and the intra prediction unit 213 are configured to determine an optimal intra prediction mode (i.e., the target prediction mode) of the video reconstruction block. The motion compensation unit 214 and the motion estimation unit 215 are configured to perform inter prediction coding of the received video reconstruction block with respect to one or more blocks of one or more reference pictures to provide temporal prediction information. The motion estimation performed by the motion estimation unit 215 is a process of generating a motion vector that can be used to estimate the motion of the video reconstruction block, and then motion compensation is performed by the motion compensation unit 214 based on the motion vector determined by the motion estimation unit 215. After the intra prediction mode is determined, the intra prediction unit 213 is further configured to provide the selected intra prediction data to the coding unit 219, and the motion estimation unit 215 also transmits the motion vector data determined by calculating to the coding unit 219. In addition, the inverse transform and inverse quantization unit 216 is configured to reconstruct the video reconstruction block so as to reconstruct a residual block in the pixel domain; the blocking effect artifact is removed from the residual block by the filter control analysis unit 217 and the filtering unit 218, and then the reconstructed residual block is added into a prediction block in the picture of the decoded picture buffer unit 210 to generate the video reconstruction blocks that have been reconstructed. The coding unit 219 is configured to encode various encoding parameters and quantized transform coefficients, in the coding algorithm based on Context-based Adaptive Binary Arithmetic Coding (CABAC), the context content may be based on neighbouring reconstruction blocks, the coding unit may be configured to encode information indicating the determined intra prediction direction and output a bitstream of the video signal. The decoded picture buffer unit 210 is configured to store the video reconstruction blocks that have been reconstructed, for prediction reference. As the video picture coding proceeds, new reconstructed video reconstruction blocks are continuously generated, and these reconstructed video reconstruction blocks are stored in the decoded picture buffer unit 210.

Figure 2B:
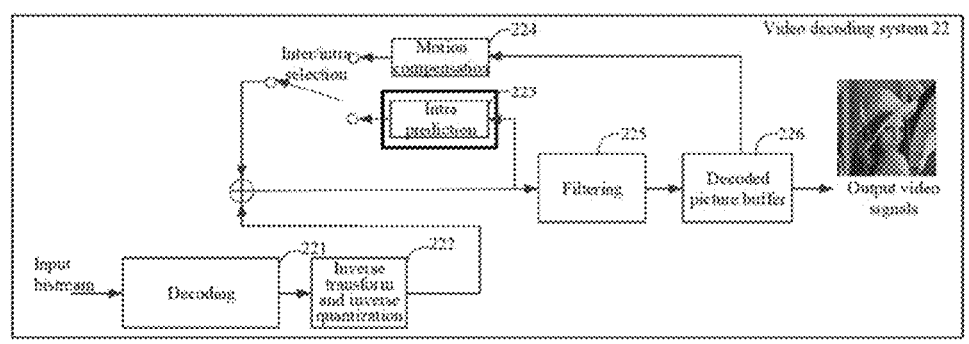
FIG. 2B is a schematic structural diagram of a video decoding system according to an embodiment of the present disclosure.

An embodiment of the present disclosure provides a video decoding system. FIG. 2B is a schematic structural diagram of a video decoding system according to an embodiment of the present disclosure. As shown in FIG. 2B, the video coding system 22 includes.

a parsing unit 221, an inverse transform and inverse quantization unit 222, an intra prediction unit 223, a motion compensation unit 224, a filtering unit 225, and a decoded picture buffer unit 226. After the input video signal is encoded by the video encoding system 21, a bitstream of the video signal is output; then the bitstream is input to the video decoding system 22 and first passed through the parsing unit 221 for obtaining the decoded transform coefficients. The transform coefficients are processed by the inverse transform and inverse quantization unit 222 to generate residual block in the pixel domain; the intra prediction unit 223 is configured to generate prediction data of a current video coding block based on the determined intra prediction direction and data from a previously decoded block of a current picture. The motion compensation unit 224 determines prediction information for the video coding block by parsing the motion vector and other associated syntax elements, and uses the prediction information to generate a prediction block of the video decoding block that is being decoded; a residual block from the inverse transform and inverse quantization unit 222 and the prediction block generated from the intra prediction unit 223 or the motion compensation unit 224 are summed to form a decoded video block; the decoded video signal is processed by the filtering unit 225 to remove the blocking effect artifact, and video quality can be improved; then the decoded video block is stored in the decoded picture buffer unit 226, which stores a reference picture for subsequent intra prediction or motion compensation, while also being used for output the video signal to obtain the recovered original video signal.

The embodiments of the present disclosure are mainly applied to the intra prediction unit 213 of the video encoding system 21 and the intra prediction unit 223 of the video decoding system 22. In other words, if a good prediction effect can be obtained by the method for intra prediction provided in the embodiments of the present disclosure in the video encoding system 21, accordingly, the recovery quality of video decoding can also be improved at the decoding end.

Based on the above, the technical solution in embodiments of the present disclosure will be described below in conjunction with reference the drawings in the embodiments. It should be noted that the terms "first", "second", "third", etc. mentioned throughout the description are only for distinguishing different features, and do not have functions such as limiting priority, order, size relationship, etc.

An embodiment of the present disclosure provides a method for intra prediction, which is applied to a video coding apparatus. The functions implemented by the method can be implemented by the processor in the video coding apparatus calling the program codes. Of course, the program codes may be stored in a computer storage medium. It can be seen that the video coding apparatus includes at least a processor and a storage medium.

Figure 3A:
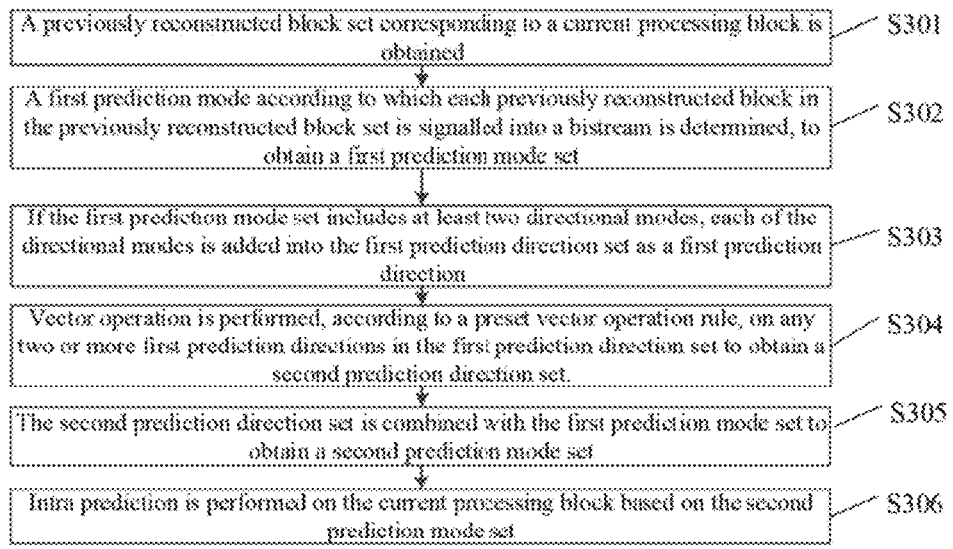
FIG. 3A is a schematic implementation flowchart of a method for intra prediction according to an embodiment of the present disclosure.

FIG. 3A is a schematic implementation flowchart of a method for intra prediction according to an embodiment of the present disclosure. As shown in FIG. 3A, the method includes the following operations S301 to S306.

In operation S301, a previously reconstructed block set corresponding to a current processing block is obtained.

Figure 3B:
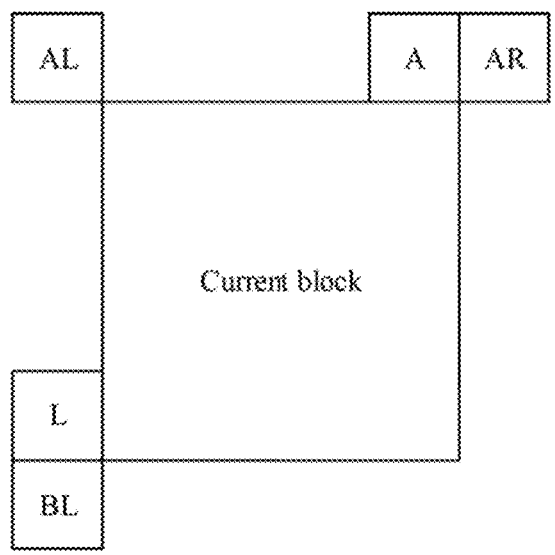
FIG. 3B is a schematic diagram illustrating neighbouring intra prediction modes according to an embodiment of the present disclosure.

Generally, a previously reconstructed block in the previously reconstructed block set is an area where intra prediction has been completed within a preset range of the current processing block, herein the previously reconstructed block refers to an area where the intra prediction has been completed, and the current processing block refers to an area where intra prediction is currently required. For example, as shown in FIG. 3B, the previously reconstructed blocks are determined from all neighboring blocks above the current processing block and all neighboring blocks on the left side of the current processing block, e.g., the neighboring blocks of the current processing block, i.e., left block (L), above block (A), below left block (BL), above right block (AR) and above left block (AL), are taken as the previously reconstructed blocks in the previously reconstructed block set.

In operation S302, a first prediction mode, that is signalled in a bitstream, corresponding to each previously reconstructed block in the previously reconstructed block set is determined, to obtain a first prediction mode set.

It should be noted herein that the first prediction mode set is the candidate prediction mode set described in the background section above. Generally, the first prediction mode set includes the DC mode, the planar mode, and directional mode(s).

In operation S303, if the first prediction mode set includes at least two directional modes, each of the directional modes is added into the first prediction direction set as a first prediction direction.

It should be noted that the first prediction direction is in fact an optimal prediction direction determined in the intra prediction based on the previously reconstructed block.

In other embodiments, the first prediction direction includes at least one of a luma intra prediction direction and a chroma intra prediction direction. It will be appreciated that, for luma blocks, if multiple candidate prediction modes in the first prediction mode set are selected to perform intra prediction on a current processing block, a smaller number of bits are used for representing the intra prediction mode of the current processing mode compared with a case where prediction modes outside the first prediction mode set are selected for intra prediction. When the first prediction direction is a luma intra prediction direction, a prediction value of a previously reconstructed block is a luma value, and for operation 306, when intra prediction is performed on a prediction direction of the current processing block, intra prediction is actually performed on the luma value of the current processing block; similarly, when the first prediction direction is a chroma intra prediction direction, the prediction value of the previously reconstructed block is a chroma value, and for operation S306, when intra prediction is performed on the prediction direction of the current processing block, intra prediction is actually performed on the chroma value of the current processing block.

In operation S304, vector operation is performed, according to a preset vector operation rule, on any two or more first prediction directions in the first prediction direction set to obtain a second prediction direction set.

It should be noted that each second prediction direction in the second prediction direction set is actually a candidate prediction direction when intra prediction is performed on the prediction direction of the current processing block. Generally, each first prediction direction in the first prediction direction set is also a candidate prediction direction used when intra prediction is performed on the prediction direction of the current processing block.

In order to avoid obtained multiple second prediction directions from having a same direction, generally, the vector operation is performed on any two or more first prediction directions having different directions in the first prediction direction set to obtain the second prediction direction set.

It can be understood that in practical applications, if the candidate prediction direction of the current processing block is constructed by simply incrementing or decrementing the index number of the first prediction direction by 1, it is not possible to obtain a sufficient prediction effect when intra prediction is performed, because obtaining the candidate prediction direction by this construction method does not sufficiently take into account the characteristics of the local content of the current processing block, and the direction information at the periphery of the current processing block is not sufficiently utilized. Therefore, in the embodiment of the present disclosure, a vector operation is performed, according to a preset vector operation rule, on any two or more first prediction directions in the first prediction direction set to obtain a second prediction direction set, that is, a new candidate prediction direction set, so that the possibility of obtaining a sufficiently accurate prediction effect is increased when intra prediction is performed on the prediction direction of the current processing block.

Figure 3C:
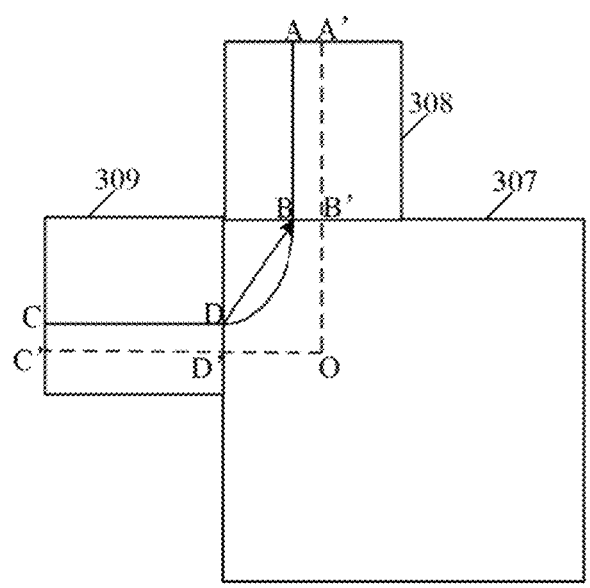
FIG. 3C is a schematic structural diagram of a prediction direction according to an embodiment of the present invention.

For example, as shown in FIG. 3C, it is assumed that the previously reconstructed block 308 of the current processing block 307 has vertical stripe information (e.g., an AB line segment), the optimal prediction direction corresponding to the previously reconstructed block 308 is BA; the previously reconstructed block 309 of the current processing block 307 has horizontal stripe information (e.g., a CD line segment), the optimal prediction direction corresponding to the previously reconstructed block 309 is DC; and the picture information included in the current processing block 307 is an arc BD. At this time, when a new candidate prediction direction is constructed based on the known directions BA and DC, if only the index numbers corresponding to the directions BA and DC respectively are incremented by 1 to obtain neighbouring directions B'A' and D'C, then when intra prediction is performed based on the directions BA, B'A', DC and D'C' the obtained prediction result is that the picture information included in the current processing block 307 is a line segment D'O and line segment OB', which is quite different from the real situation (that is, the picture information included in the current processing block 307 is the arc BD). Therefore, in order to increase the possibility of obtaining a sufficiently accurate prediction effect, it is possible to perform vector subtraction on the directions BA and DC to obtain a direction BD, and the direction BD is also used as the candidate prediction direction (i.e., the second prediction direction).

In operation S305, the second prediction direction set is combined with the first prediction mode set to obtain a second prediction mode set.

In operation S306, intra prediction is performed on the current processing block based on the second prediction mode set.

In practical applications, the second prediction direction set includes not only the direction information of the second prediction direction, but also the corresponding index information.

In an embodiment of the present disclosure, a method for intra prediction is provided, a previously reconstructed block set corresponding to a current processing block is obtained; a first prediction direction, that is signalled in a bitstream, corresponding to each previously reconstructed block in the previously reconstructed block set is determined (i.e., a known candidate prediction direction of the current processing block), to obtain a first prediction mode set; if the first prediction mode set includes at least two directional modes, each of the directional modes is added into the first prediction direction set as a first prediction direction; vector operation is performed, according to a preset vector operation rule, on any two or more first prediction directions in the first prediction direction set to obtain a second prediction direction set (it can be understood that the second prediction direction in the second prediction direction set is a new candidate prediction direction of the current processing block); and the second prediction direction set is combined with the first prediction mode set to obtain a second prediction mode set, intra prediction is performed on the current processing block based on the second prediction mode set.

In this way, a new candidate prediction direction is constructed by performing a vector operation on two or more known candidate prediction directions, that is, the second prediction direction set is combined with the first prediction mode set to obtain the second prediction mode set, and intra prediction is performed on the current processing block based on the second prediction mode set, so that the possibility of obtaining a sufficiently accurate prediction effect can be increased.

An embodiment of the present disclosure provides another method for intra prediction including operations S401 to S407.

In operation S401, a previously reconstructed block set corresponding to a current processing block is obtained.

In operation S402, a first prediction mode, that is signalled in a bitstream, corresponding to each previously reconstructed block in the previously reconstructed block set is determined, to obtain a first prediction mode set.

In operation S403, if the first prediction mode set includes at least two directional modes, each of the directional modes is added into the first prediction direction set as a first prediction direction.

In operation S404, vector operation is performed, according to a preset vector operation rule, on any two or more first prediction directions in the first prediction direction set to obtain a second prediction direction set.

In operation S405, the second prediction direction set is combined with the first prediction mode set to obtain a second prediction mode set.

In operation S406, intra prediction is performed on the current processing block based on the second prediction mode set, to obtain a target prediction direction and a difference between a prediction value of each sample in the current processing block corresponding to the target prediction direction and an original value of the sample.

Herein, it should be noted that operation S406 is actually an implementation example of operation S306 of the above-described embodiment.

Generally, the target prediction direction is the optimal prediction direction of the current processing block, that is, a small rate-distortion cost can be obtained by the target prediction direction, or the difference between the prediction value of each sample of the current processing block and the original value of the sample can be minimized, thereby the video compression ratio can be improved and the number of bits of video coding can be saved.

In operation S407, the target prediction direction and each difference are signalled in a bitstream of the current processing block.

In other embodiments, when the target prediction direction is signalled in the bitstream of the current processing block, an index number of the target prediction direction may be signalled in the bitstream of the current processing block. For the luma mode, if the target prediction direction is obtained by performing a vector operation on two first prediction directions, after the target prediction direction is determined, a prediction direction having an angle with the target prediction direction smaller than a preset threshold value can be determined from the 67 intra prediction directions supported by the VVC shown in FIG. 1B, an index number of the prediction direction having the angle smaller than the preset threshold value is signalled in the bitstream of the current processing block as the index number of the target prediction direction.

For example, if the target prediction direction $F_{d3}$ is obtained by a direct vector addition of the prediction direction $F_{d1}$ and the prediction direction $F_{d2}$, that is, $\tilde{F}_{d3} = \tilde{F}_{d1} + \tilde{F}_{d2}$, where $d_1$, $d_2$, and $d_3$ are index numbers corresponding to the prediction directions, the index number $d_3$ of the target prediction direction $F_{d3}$ may be signalled ($d_3 = (d_1 + d_2)/2$).

An embodiment of the present disclosure provides yet another method for intra prediction including operations S501 to S508.

In operation S501, a previously reconstructed block set corresponding to a current processing block is obtained.

In operation S502, a first prediction mode, that is signalled in a bitstream, corresponding to each previously reconstructed block in the previously reconstructed block set is determined, to obtain a first prediction mode set.

In operation S503, if the first prediction mode set includes at least two directional modes, each of the directional modes is added into the first prediction direction set as a first prediction direction.

In operation S504, any two or more first prediction directions with different directions in the first prediction direction set are determined as a prediction group to obtain a prediction group set.

For example, it is assumed that the first prediction directions having different directions in the first prediction direction set is direction 1, direction 2, and direction 3, then the prediction group set obtained by defining the number of directions in the prediction group as 2 includes three prediction groups, that is, (direction 1, direction 2), (direction 1, direction 3), and (direction 2, direction 3).

It will be appreciated that if only the any two or more first prediction directions with different directions in the first prediction direction set are determined as a prediction group, a number of prediction groups in the prediction group set can be reduced, and thereby the amount of calculation for implementing operation S504 can be reduced.

In operation S505, vector operation is performed, according to the preset vector operation rule, on two or more first prediction directions in each prediction group in the prediction group set to obtain the second prediction direction set.

Herein, it should be noted that, in fact, operation S504 is one implementation example of operation S304 or operation S304 of the above-described embodiment.

Each first prediction direction in the first prediction direction set is included in the second prediction direction set. Taking the obtained prediction groups (direction 1, direction 2), (direction 1, direction 3) and (direction 2, direction 3) as an example, it is assumed that vector addition is performed on two directions in each prediction group, for example, vector addition are performed on the direction 1 and the direction 2 to obtain direction 4; vector addition are performed on the direction 1 and the direction 3 to obtain direction 5; vector addition are performed on the direction 2 and direction 3 to obtain direction 6; in this way, the obtained second prediction direction set includes the direction 1, the direction 2, the direction 3, the direction 4, the direction 5, and the direction 6.

In operation S506, the second prediction direction set is combined with the first prediction mode set to obtain a second prediction mode set.

In operation S507, intra prediction is performed on the current processing block based on the second prediction mode set, to obtain a target prediction direction and a difference between a prediction value of each sample in the current processing block corresponding to the target prediction direction and an original value of the sample.

In operation S508, the target prediction direction and each difference are signalled in a bitstream of the current processing block.

An embodiment of the present disclosure provides yet another method for intra prediction including operations S601 to S611.

In operation S601, a previously reconstructed block set corresponding to a current processing block is obtained.

In operation S602, a first prediction mode, that is signalled in a bitstream, corresponding to each previously reconstructed block in the previously reconstructed block set is determined, to obtain a first prediction mode set.

In operation S603, if the first prediction mode set includes at least two directional modes, each of the directional modes is added into the first prediction direction set as a first prediction direction.

In operation S604, any two or more first prediction directions with different directions in the first prediction direction set are determined as a prediction group to obtain a prediction group set.

In operation S605, a weighting factor of each first prediction direction in each prediction group is determined, herein the weighting factor is used to represent a degree of correlation between the previously reconstructed block corresponding to the first prediction direction and the current processing block.

In general, a previously reconstructed block closer to the current processing block has a greater degree of correlation with the current processing block, and the corresponding weighting factor is also greater.

In operation S606, the first prediction direction corresponding to each of the weighting factors is preprocessed to enable each of preprocessed first prediction directions to have a same length.

For example, each prediction direction has a unit length.

In operation S607, each of the weighting factors is multiplied with a corresponding preprocessed first prediction direction to obtain a third prediction direction set.

Herein, it should be noted that, in fact, operations S604 to S607 are one implementation example of operation S505 of the above-described embodiment.

Figure 4:
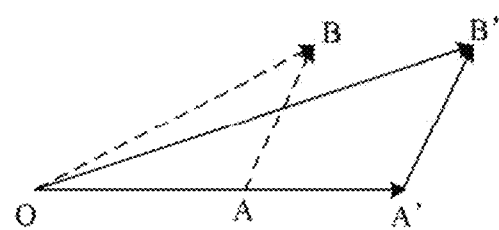
FIG. 4 is a schematic diagram of a vector operation according to an embodiment of the present disclosure.

It will be appreciated that multiplying a value (i.e., the weighting factor) with a vector will only change the length of the vector and will not change the direction of the vector. For example, as shown in FIG. 4, the preprocessed first prediction direction is OA with a unit length, and if the weighting factor of OA is 2, the third prediction direction obtained by multiplying is OA'.

In operation S608, vector operation is performed on any two or more third prediction directions in the third prediction direction set to obtain the second prediction direction set.

It will be appreciated, in order to obtain a most probable second prediction direction as the candidate prediction direction for the current processing block, a greater weighting factor is generally assigned to the prediction direction corresponding to the previously reconstructed block with a stronger correlation with the current processing block, and a smaller weighting factor is assigned to a prediction direction corresponding to the previously reconstructed block with a weaker correlation with the current processing block. For example, as shown in FIG. 4, the weighting factor assigned to the direction OA is 2, and the weighting factor assigned to the direction AB is 1. Correspondingly, the weighting factor 2 is multiplied with the direction OA to obtain the direction OA', the weighting factor 1 is multiplied with the direction AB to obtain the direction AB, and the direction AB is shifted to the A' to obtain the direction A'B'. As can be seen, the length of the direction OA' is greater than the length of the direction A'B'. In this way, when the vector addition is performed on the direction OA' and the direction A'B', the resulting direction OB' (i.e., the second prediction direction) is biased towards the direction OA', so that a more accurate prediction effect can be obtained. Compared with directly performing vector operation on OA and AB to obtain the candidate prediction direction OB of the current processing block, the second prediction direction OB' obtained herein by performing vector operation after weight processing is closer to the real situation.

In operation S609, the second prediction direction set is combined with the first prediction mode set to obtain a second prediction mode set.

In operation S610, intra prediction is performed on the current processing block based on the second prediction mode set, to obtain a target prediction direction and a difference between a prediction value of each sample in the current processing block corresponding to the target prediction direction and an original value of the sample.

In operation S611, the target prediction direction and the difference are signalled in a bitstream of the current processing block.

An embodiment of the present disclosure provides another method for intra prediction including operations S701 to S711.

In operation S701, a previously reconstructed block set corresponding to a current processing block is obtained.

In operation S702, a first prediction mode, that is signalled in a bitstream, corresponding to each previously reconstructed block in the previously reconstructed block set is determined, to obtain a first prediction mode set.

In operation S703, if the first prediction mode set includes at least two directional modes, each of the directional modes is added into the first prediction direction set as a first prediction direction.

In operation S704, any two or more first prediction directions with different directions in the first prediction direction set are determined as a prediction group to obtain a prediction group set.

In operation S705, a distance between the previously reconstructed block corresponding to each first prediction direction in each prediction group and the current processing block is determined.

Herein, it should be noted that, in fact, operations S704 and S705 are one implementation example of operations S605 of the above-described embodiment.

In operation S706, the weighting factor is assigned, according to a preset weighting factor assignment rule, to a corresponding first prediction direction based on each of the distances.

In other embodiments, the weighting factor assignment rule may be a mapping table of distances and weighting factors, based on which the weighting factor corresponding to each of the distances may be determined to allocate a weighting factor to a first prediction direction corresponding to each of the distances. For example, the smaller the distance is, the greater the assigned weighting factor is. In this way, when the vector operation is performed, the obtained prediction direction is made to be biased towards the prediction direction having a greater weighting factor, so that the possibility of obtaining a sufficiently accurate prediction effect is increased when the intra prediction is performed.

Figure 5A:
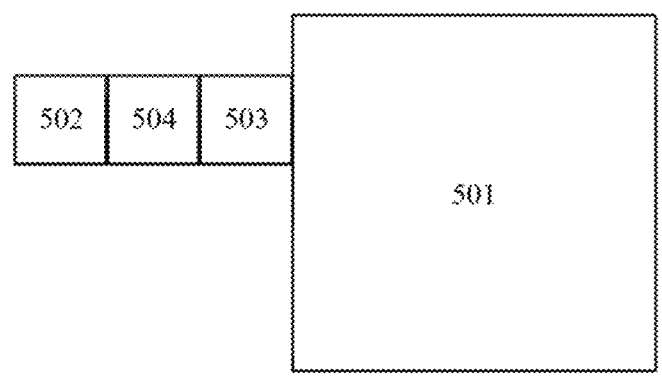
FIG. 5A is a schematic diagram of an arrangement of picture blocks according to an embodiment of the present disclosure.

For example, for operation S704, the distance between the previously reconstructed block and the current processing block may be determined according to, for example, a number of blocks spaced between the previously reconstructed block and the current processing block. For example, as shown in FIG. 5A, the current processing block 501 is separated from the previously reconstructed block 502 by a block 503 and a block 504, then it can be determined that the distance between the previously reconstructed block 502 and the current processing block 501 is 2. The weighting factor assignment rule for prediction is assumed to be as shown in Table 1 below.

TABLE 1

| distance | weighting factor |
|---|---|
| 0 | 4 |
| 1 | 3 |
| 2 | 2 |
| ... | ... |

Based on Table 1 above, it can be determined that the weighting factor of the first prediction direction corresponding to the previously reconstructed block 502 is 2.

Figure 5B:
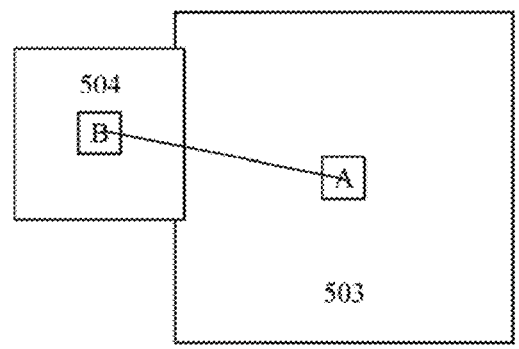
FIG. 5B is a schematic diagram of determining a distance according to an embodiment of the present disclosure.

As another example, for operation S704, the distance between the previously reconstructed block and the current processing block may also be determined according to a number of samples spaced between the previously reconstructed block and the current processing block. For example, as shown in FIG. 5B, with the sample A of the current processing block 503 as a reference sample, a total number M of pixels from the sample A of the current processing block 503 to the sample B of the previously reconstructed block 504 is determined, and M is determined as the distance between the previously reconstructed block 504 and the current processing block 503. It should be noted that the setting rule for the reference sample of each current processing block is consistent, for example, the center point of the current processing block may be used as a reference sample. The weighting factor assignment rule for prediction is assumed to be as shown in Table 2 below:

TABLE 2

| distance range | weighting factor |
|---|---|
| [50, 100) | 4 |
| (100, 150] | 3 |
| [150, 300) | 2 |
| ... | ... |

Based on Table 2 above, the distance range to which M belongs can be determined to obtain a corresponding weighting factor.

In operation S707, the first prediction direction corresponding to each of the weighting factors is preprocessed to enable each of preprocessed first prediction directions to have a same length.

In operation S708, each of the weighting factors is multiplied with a corresponding preprocessed first prediction direction to obtain a third prediction direction set.

In operation S709, vector operation is performed on any two or more third prediction directions in the third prediction direction set to obtain the second prediction direction set.

In other embodiments, for operation S709, vector addition or vector subtraction may be performed on any two or more of the third prediction directions in the third prediction direction set to obtain the second prediction direction set.

In operation S710, the second prediction direction set is combined with the first prediction mode set to obtain a second prediction mode set.

In operation S711, intra prediction is performed on the current processing block based on the second prediction mode set.

An embodiment of the present disclosure provides yet another method for intra prediction including operations S801 to S809.

In operation S801, a neighbouring previously reconstructed block set corresponding to a current processing block is obtained.

In operation S802, a first prediction mode, that is signalled in a bitstream, corresponding to each neighbouring previously reconstructed block in the neighbouring previously reconstructed block set is determined, to obtain a first prediction mode set.

In operation S804, if the first prediction mode set includes at least two directional modes, each of the directional modes is added into the first prediction direction set as a first prediction direction.

In operation S805, any two or more first prediction directions with different directions in the first prediction direction set are determined as a prediction group to obtain a prediction group set.

In operation S806, vector addition is performed on two first prediction directions in each prediction group to obtain a second prediction direction set.

In operation S807, the second prediction direction set is combined with the first prediction mode set to obtain a second prediction mode set.

In operation S808, intra prediction is performed on the current processing block based on the second prediction mode set, to obtain a target prediction direction and a difference between a prediction value of each sample in the current processing block corresponding to the target prediction direction and an original value of the sample.

In operation S809, the target prediction direction and the difference are signalled in a bitstream of the current processing block.

Currently, there are three methods for constructing an intra prediction direction.

The first method is a construction method of luma intra prediction directions in the VVC draft, and related description is as follows.

In the early Joint Exploration Model (JEM), the most probable mode list including 6 most probable modes, that is, the MPM list, was used in the luma prediction direction coding. As shown in FIG. 3B, the intra prediction directions (also referred to as intra prediction directions) of the five neighbouring blocks of the current processing block 601 are taken into account in the derivation process of the MPM list, where five neighbouring blocks are the left (L) block, the above (A) block, the below left (BL) block, the above right (AR) block, and the above left (AL) block.

The candidate prediction directions of the MPM list are divided into three groups: a neighbouring prediction direction, a derived prediction direction, and a default prediction direction. First, neighbouring prediction directions are added into the MPM list. Each intra prediction direction in the MPM list can be added only once, that is, the MPM list cannot contain duplicated prediction directions. If the number of the prediction directions included in the MPM list is less than 6 after the neighbouring prediction directions are added, the derived intra prediction directions are added into the MPM list. Furthermore, if the number of the prediction direction included in the MPM list after the addition of the derived prediction direction is completed is still less than 6, the default prediction direction is added into the MPM list until the MPM list containing 6 most probable intra prediction directions is derived.

When entropy coding is performed on the intra prediction direction of each luma block, the MPM list of the luma block is first obtained, and it is determined whether the intra prediction direction selected for the luma block is in the MPM list. If the intra prediction direction selected for the luma block is in the MPM list, an index number of the prediction direction in the MPM is binarized by using the truncated binary code; the smaller the index number is, the smaller the generated truncated binary code, and then the truncated binary code is encoded by using an arithmetic encoder, so that bit overhead can be saved. If the intra prediction direction selected for the luma block is one of the remaining 61 prediction directions that are not in the MPM list, the 61 prediction directions are re-numbered from 0, and 16 prediction directions whose numbers are divisible by 4 are selected as the selected modes. If the intra prediction direction is in the selected mode, bypass coding is performed by using a fixed 4-bit length. If the intra prediction direction is in the remaining 45 non-selected modes, the 45 non-selected modes are re-numbered again from 0, their numbers are binarized using the truncated binary code, and a bit string of 5 or 6 bits in length is generated according to sizes of the numbers, then bypass coding is performed.

Figure 6:
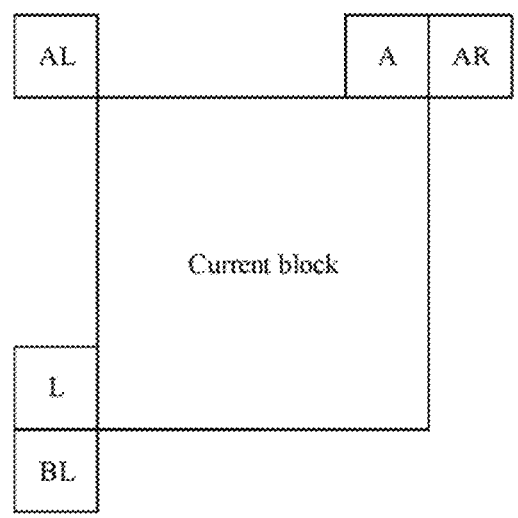
FIG. 6 is another schematic diagram illustrating neighbouring intra predication modes according to an embodiment of the present disclosure.

Since the 6MPM list in JEM is complex, a scheme using a simplified 3MPM list was then proposed. However, the 3MPM list includes less prediction directions, and the prediction effect obtained is not accurate enough. Later, a simplified 6MPM list (which is also a method used in the current VVC draft) was proposed. For example, a new candidate prediction direction of the current processing block 601 is constructed based on a target prediction direction corresponding to the above (A) block and a target prediction direction corresponding to the left (L) block in FIG. 6, and the derivation process thereof is as follows.

```
dirL==dirA
    dir<2
        MPM0=dir (Planar or DC)
        MPM1=Planar/DC
        MPM2=50 (vertical)
        MPM3=18 (horizontal)
        MPM4=50-4
        MPM5=50+4
    dir>=2
        MPM0=dir
        MPM1=Planar
        MPM2=DC
        MPM3=dir-1
        MPM4=dirt+1
        MPM5=dir-2
dirL!=dirA
    all are angles
        MPM0=dirL
        MPM1=dirA
        MPM2=Planar
        MPM3=DC
        MPM4=greater angle-1
        MPM5=greater angle+1
    one is angle
        MPM0=dirL
        MPM1=dirA
        MPM2=Planar/DC
        MPM3=angle-1
        MPM4=angle+1
        MPM5=angle-2
```

The second method is a construction method of chroma intra prediction direction in the VVC draft, and is described as follows, as shown in Table 3.

TABLE 3

Figure 7:
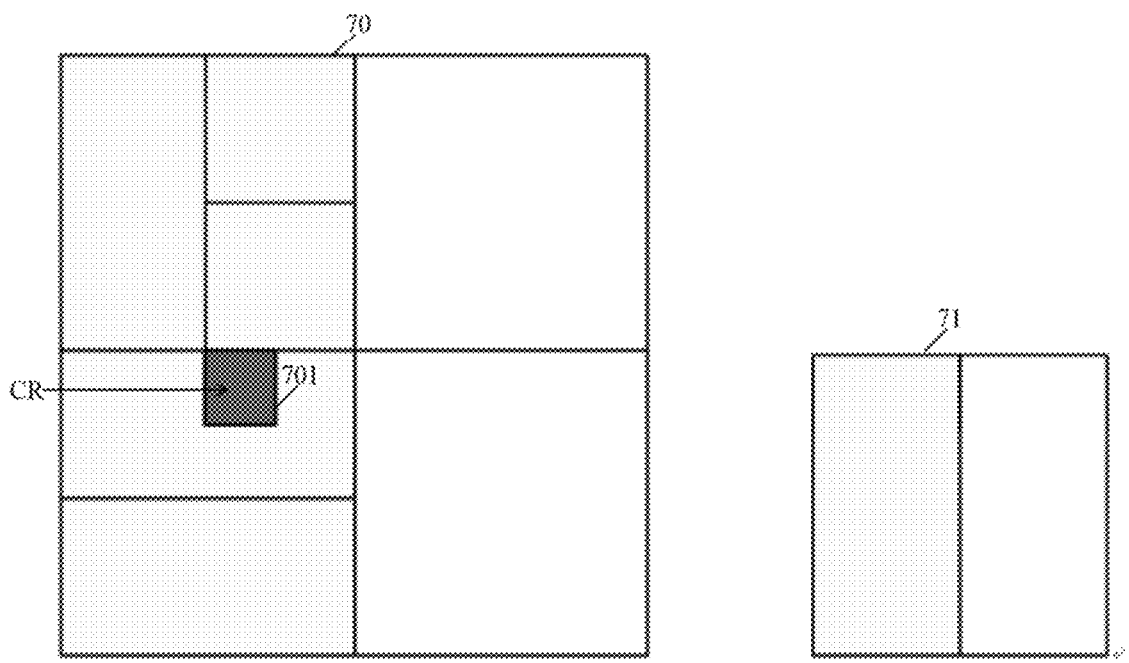
FIG. 7 is a schematic diagram of arrangement of luma blocks and chroma corresponding to a current processing block according to an embodiment of the present disclosure.

| Serial number | Name | Description |
| --- | --- | --- |
| 1 | Derived Mode (DM) | See the prediction mode corresponding to the luma center block CR in FIG. 7 |
| 2 | CCLM CCLM_L CCLM_T | A prediction signal is constructed by using a scheme of a*luma value + b CCLM: a and b are calculated according to the previous row and the left column CCLM_L: a and b are calculated by using the left column CCLM_T: a and b are calculated by using the previous row |
| 3 | DC | Prediction direction index number 1 in FIG. 1B, if the DM is the DC mode, changed to 66 |
| 4 | PLANAR | Prediction direction index number 0 in FIG. 1B, if the DM is the planar mode, changed to 66 |
| 5 | VER | Prediction direction index number 50 in FIG. 1B, if the DM is the VER mode, changed to 66 |
| 6 | HOR | Prediction direction index number 18 in FIG. 1B, if the DM is the HOR mode, changed to 66 |

FIG. 7 is a schematic diagram illustrating arrangement of luma blocks and chroma corresponding to the current processing block according to an embodiment of the present disclosure. As shown in FIG. 7, the gray area in the left half of the tight square is a current processing chroma block 71, and the gray area in the left half of the left square is a luma area corresponding to the current processing chroma block 71. When intra prediction of the current chroma block 71 is performed, a prediction mode recorded by means of the center position of the luma area is the prediction mode of the CR luma block 701 in the left square of FIG. 7

With reference to the contents shown in Table 3 and FIG. 7, it can be determined that if the prediction direction obtained by the DM is the same as one of the last four prediction directions, the same mode in rows 3 to 6 is replaced with a prediction direction with an index number of 66.

The third method is Multiple Direct Modes (MDMS) for chroma intra coding, and the relevant description of the method is as follows.

MDMS is a more complex method for constructing chroma intra prediction directions. As shown in Table 4, there is a bit rate saving of 0.2% compared with the first scheme, but because the complexity is too high, it has not been applied to VVC.

TABLE 4

| Serial number | Name | Narration |
| --- | --- | --- |
| 1 | CCLM | A prediction signal is constructed by using a scheme of a*luma value + b |
| Pick out 5 prediction directions in order | DM | Intra prediction directions of luma blocks corresponding to five positions including CR, TL, TR, BL and BR of current chroma block, i.e., blocks 801 to 805 in FIG. 8(a) |
| | Chroma neighbouring block | Intra prediction directions of L block, AL block, BL block, A block and AR block spatially neighbouring to a chroma block, i.e., blocks 806 to 810 in FIG. 8(b) |
| | DC | Prediction direction index number 1 in FIG. 1B |
| | PLANAR | Prediction direction index number 0 in |

TABLE 4-continued

| Serial number | Name | Narration |
|---|---|---|
| | Trimming of existing prediction direction | FIG. 1B Prediction direction derived from the existing prediction direction incremented or decremented by 1 |
| | Default mode: | VER (18), HOR (50), 2, 34, 66, 10, 26 |

Figure 8:
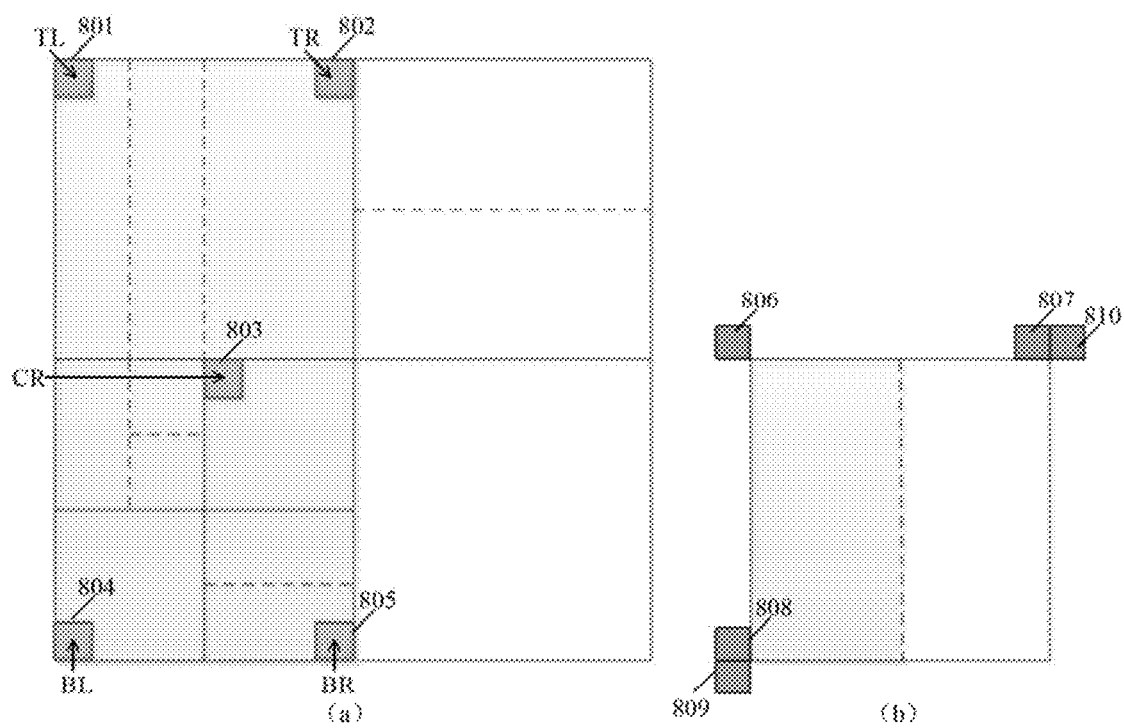
FIG. 8 is a schematic diagram of an arrangement of chroma blocks according to an embodiment of the present disclosure.

FIG. 8 is a schematic diagram illustrating arrangement of chroma blocks used in the DM mode and the chroma neighbouring block mode, respectively, in Table 4. As shown in blocks 801 to 805 in FIG. 8(a), the DM modes in Table 4 are intra prediction modes of luma blocks corresponding to five positions including CR, TL, TR, BL and BR of current chroma block. As shown in blocks 806 to 810 in FIG. 8(b), the chroma neighbouring block modes in Table 4 are intra prediction directions of L block, AL block, BL block, A block and AR block spatially neighbouring to a chroma block, that is, the signalled prediction directions.

Figure 9:
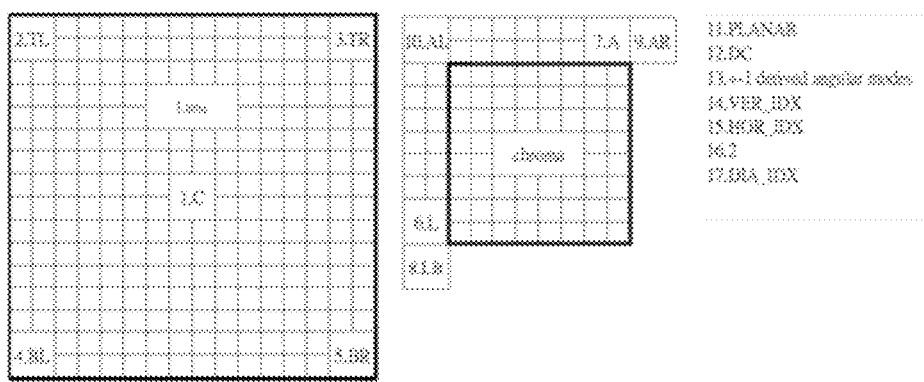
FIG. 9 is a schematic diagram illustrating a traversal sequence of intra prediction directions of MDMS according to an embodiment of the present disclosure.

FIG. 9 is a schematic diagram of the traversal sequence of the intra prediction directions of MDMS. As shown in FIG. 9, the traversal is sequentially performed according to numbers 1 to 17 as follows: 1. central luma block C; 2. top left luma block TL; 3. top right luma block TR; 4. below left luma block BL; 5. below right luma block BR; 6. left chroma block L; 7. above chroma block A; 8. below left chroma block BL; 9. above right chroma block AR; 10. above left chroma block AL; 11. PLANAR; 12. DC; 13. existing prediction direction index numbers incremented or decremented by 1; 14. VER; 15. HOR; 16. a prediction direction index number 2; and 17. a prediction direction index number 34.

It should be noted that the DC mode, the planar mode, the VER (18) mode, and the HOR (50) mode in Table 4 above are forced filling modes, and they will replace candidate modes at the end of the list if the candidate list is full.

As can be seen from the above three conventional construction methods of the prediction directions, the construction method of luma intra prediction directions in VVC is simple, and when increment or decrement is performed on the basis of an existing prediction direction in the MPM, an operation of incrementing or decrementing an index number of the existing prediction direction by 1 and incrementing or decrementing the index number by 2 is used to obtain the neighbouring prediction direction. The gain of the MDMS is relatively obvious, and when increment or decrement is performed on the basis of the existing prediction direction in the MPM, the operation of incrementing or decrementing an index number of the existing prediction direction by 1 is also used to obtain the neighbouring prediction direction.

However, the method of constructing a new prediction direction by incrementing or decrementing the index number of the existing prediction direction by 1 or 2 does not sufficiently take into account the characteristics of the local contents of the current processing block, and does not fully utilize the direction information at the periphery of the current processing block, so that the prediction effect is still not sufficiently accurate in the prediction process.

Based on the above, in the embodiments of the present disclosure, if there multiple directions indicated in direction information around the current processing block, a new prediction direction can be constructed using an average value of the directions.

Figure 10:
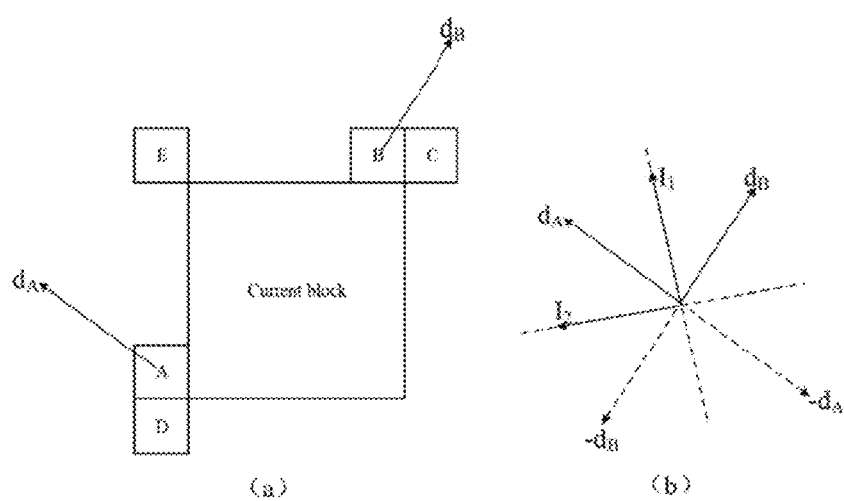
FIG. 10 is a schematic diagram of another vector operation according to an embodiment of the present disclosure.

For example, when luma and/or chroma intra prediction is performed on the current processing block, if multiple prediction directions (that is, the first prediction directions) are used as reference, a new average prediction direction (that is, the second prediction direction) may be constructed as alternative information. As shown in FIG. 10, the prediction direction $d_A$ of a block A is obtained in FIG. 10(a), the prediction direction $d_B$ of a block B is obtained, new prediction directions $I_1$ and $I_2$ are generated along a midline of an included angle between the prediction directions $d_A$ and $d_B$, and a prediction direction conforming to the current processing block is selected as an alternative. Then, an original alternative obtained by incrementing or decrementing the direction index number by 1 is replaced.

In a specific implementation example where the luma MPM list is constructed, for example, when the prediction directions $d_A$ of the block A and the prediction directions $d_B$ of the block B are not equal, a reference prediction direction (i.e., the second prediction direction) constructed by vector addition or vector subtraction performed on the $d_A$ and the $d_B$ is used to replace the original "greater angle+1" and "greater angle−1", or is added in front of the derived mode of "angle+/−1" as an alternative mode.

It should be noted that, based on the VVC TEST MODEL (VTM) 3.0, compared with original technical solutions, the technical solutions of the present disclosure can save the coding bit rate on the premise of a same video recovery quality, specifically, a decrease of 0.01% in the bit rate.

In other embodiments, for an implementation of determining a list of candidate chroma prediction directions (i.e., the second prediction direction set), for example, in MDMS and similar solutions, the resulting DMs are angular modes and have mutually different directions (e.g., the index numbers of the two directions are different); alternatively, when the obtained intra prediction directions of the neighbouring block of the current chroma block are angular modes and have different values from each other, for example, there are two different directions $d_A$ and $d_B$, then a reference prediction direction (i.e., the second prediction direction) constructed by vector addition or vector subtraction performed on the $d_A$ and the $d_B$ is used to replace the original "existing angular mode+/−1", or is added in front of the derived mode of "existing angular mode+/−1" as an alternative mode.

In other embodiments, only one average angular direction (i.e., the second prediction direction) may be used to be added into the candidate list (i.e., the second prediction direction set), such as only the direction obtained by vector addition of directions $d_A$ and $d_B$, i.e., $I_1$ in FIG. 10(b) is added; or, only the direction obtained by vector subtraction of directions $d_A$ and $d_B$, i.e., $I_2$ in FIG. 10(b) is added; and when the luma MPM is constructed, the only one average angular direction is used to replace the original "greater angle+1" or "greater angle−1", or $I_1$ or $I_2$ is put in front of the alternative of the "angle+/−1".

In other embodiments, only one average angular direction may be used to be added into the candidate list, such as only the direction obtained by vector addition of directions $d_A$ and $d_B$, i.e., $I_1$ in FIG. 10(b) is added; and when the chroma prediction mode list is constructed, the only one average angular direction is used to replace the original "existing angular mode+/−1", or is added in front of the derived mode of "existing angular mode+/−1" as an alternative mode.

In other embodiments, since a technique such as MDMS may generate a plurality of different angles when a list of chroma prediction modes is constructed, a plurality of average angle directions may be used to be added into the candidate list, for example, if there are three different angle directions $d_A$, $d_B$ and $d_C$, all or a pan of a new prediction direction set (i.e., the second prediction direction set) obtained by vector addition or vector subtraction of any two of the three directions $d_A$, $d_B$ and $d_C$ may be considered to be added as candidate(s), so as to replace an original "existing angular mode+/−1", or so as to be placed in front of the alternative of "angle+/−1", when the list of chroma prediction modes is constructed.

Based on the foregoing embodiments, an embodiment of the present disclosure provides a device for intra prediction including modules included therein and units included in the modules, which may be implemented by a processor in a video coding apparatus; it is also possible to implement the device by specific logic circuits; in the implementation, the processor may be a central processing unit (CPU), a microprocessor (MPU), a digital signal processor (DSP), or a field programmable gate array (FPGA), etc.

Figure 11A:
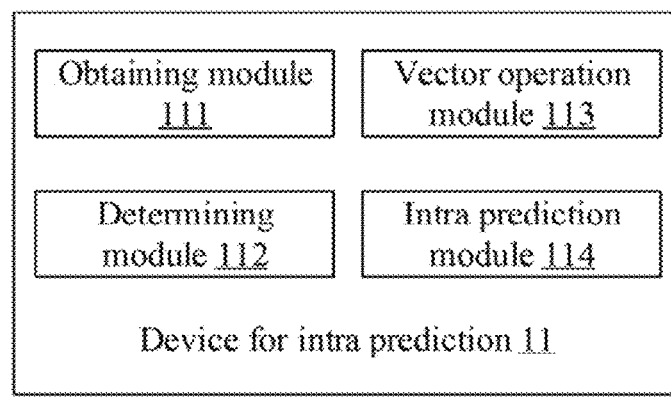
FIG. 11A is a schematic structural diagram of a device for intra prediction according to an embodiment of the present disclosure

FIG. 11A is a schematic structural diagram of a device for intra prediction according to an embodiment of the present disclosure. As shown in FIG. 11A, the device 11 includes:
- an obtaining module 111, configured to obtain a previously reconstructed block set corresponding to a current processing block;
- a determining module 112, configured to determine a first prediction mode, that is signalled in a bitstream, corresponding to each previously reconstructed block in the previously reconstructed block set, to obtain a first prediction mode set; if the first prediction mode set includes at least two directional modes, add each of the directional modes into the first prediction direction set as a first prediction direction;
- a vector operation module 113, configured to perform, according to a preset vector operation rule, vector operation on any two or more first prediction directions in the first prediction direction set to obtain a second prediction direction set;
- an intra prediction module 114, configured to combine the second prediction direction set with the first prediction mode set to obtain a second prediction mode set, and perform intra prediction on the prediction direction of the current processing block based on the second prediction mode set.

In other embodiments, the intra prediction module 114 is configured to perform intra prediction on the current processing block to obtain a target prediction direction and a difference between a prediction value of each sample in the current processing block corresponding to the target prediction direction and an original value of the sample.

Figure 11B:
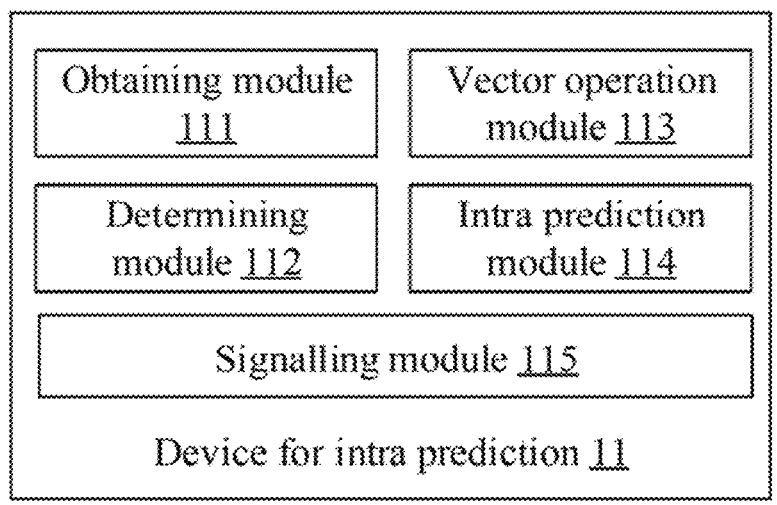
FIG. 11B is a schematic structural diagram of another device for intra prediction according to an embodiment of the present disclosure.

In other embodiments, as shown in FIG. 11B, the device it further includes a signalling module 115; the signalling module 115 is configured to signal the target prediction direction and the difference in a bitstream of the current processing block.

In other embodiments, the vector operation module 113 includes:
- a determining unit, configured to determine any two or more first prediction directions with different directions in the first prediction direction set as a prediction group to obtain a prediction group set;
- a vector operation unit, configured to perform, according to the preset vector operation rule, vector operation on two or more first prediction directions in each prediction group in the prediction group set to obtain the second prediction direction set.

In other embodiments, the vector operation unit includes:
a determining subunit, configured to determine a weighting factor of each first prediction direction in each prediction group, wherein the weighting factor is used to represent a degree of correlation between the previously reconstructed block corresponding to the first prediction direction and the current processing block;
a preprocessing subunit, configured to preprocess the first prediction direction corresponding to each of the weighting factors to enable each of preprocessed first prediction directions to have a same length;
a calculation subunit, configured to multiply each of the weighting factors with a corresponding preprocessed first prediction direction to obtain a third prediction direction set;
a vector operation subunit, configured to perform vector operation on any two or more third prediction directions in the third prediction direction set to obtain the second prediction direction set.

In other embodiments, the determining subunit is configured to:
determine a distance between the previously reconstructed block corresponding to each first prediction direction in each prediction group and the current processing block;
assign, according to a preset weighting factor assignment rule, the weighting factor to a corresponding first prediction direction based on each of the distances.

In other embodiments, the vector operation subunit is configured to:
perform vector addition or vector subtraction on any two or more third prediction directions in the third prediction direction set to obtain the second prediction direction set.

In other embodiments, the first prediction direction includes at least one of a luma intra prediction direction or a chroma intra prediction direction.

The description of the above device embodiment is similar to that of the above method embodiment, and has a beneficial effect similar to that of the method embodiment. For technical details not disclosed in the device embodiments of the present application, reference is made to the description of the method embodiments of the present application.

It should be noted, if the function of the method for intra prediction is realized in the form of a software function unit and sold or used as an independent product, it can be stored in a computer readable storage medium. Based on such understanding, the technical solution of the present disclosure, in essence or in part contributing to the related art, may be embodied in the form of a software product, which is stored in a storage medium, includes several instructions for making a computer device (which can be a personal computer, a server, a network device, etc.) to perform all or part of the method according to each embodiment of the present disclosure. The aforementioned storage media include: U disk, mobile hard disk, read-only memory (ROM), random access memory (RAM), disk or optical disk and other media that can store program code. Thus, the embodiments of the present disclosure are not limited to any particular combination of hardware and software.

Figure 12:
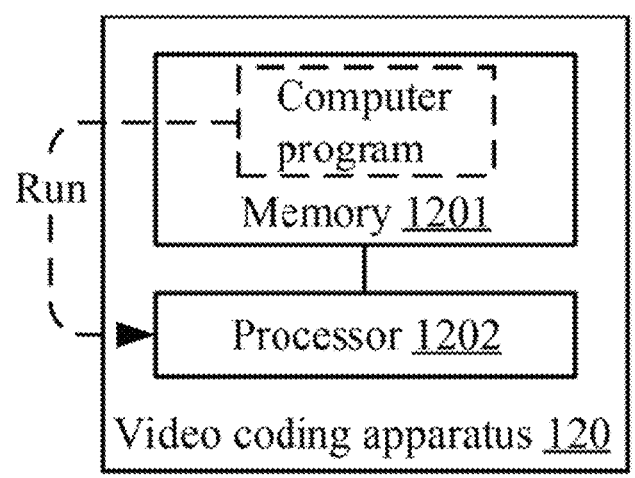
FIG. 12 is a schematic diagram of a hardware entity of a video coding apparatus according to an embodiment of the present disclosure.

Accordingly, an embodiment of the present disclosure provides a video coding apparatus, and FIG. 12 is a schematic diagram of a hardware entity of the video coding apparatus according to an embodiment of the present disclosure. As shown in FIG. 12, the video coding apparatus 120 includes a memory 1201 that stores a computer program that can run on the processor 1202, and a processor 1202 that implements the operations in the intra prediction method provided in the foregoing embodiment when the processor 1202 executes the program.

It should be noted that the memory 1201 is configured to store instructions and applications executable by the processor 1202, and may also cache data (e.g., picture data, audio data, voice communication data, and video communication data) to be processed or already processed by various modules in the to-be-processed processor 1202 and the video coding apparatus 120, which may be implemented by a flash memory (FLASH) or a Random Access Memory (RAM).

Accordingly, an embodiment of the present disclosure provides a computer-readable storage medium having stored thereon computer programs which, when executed by a processor, implements the operations in the method for intra prediction provided in the above-described embodiments.

It should be noted that the above description of the storage medium and apparatus embodiments is similar to the above description of the method embodiments and has the advantages similar to the method embodiments. For technical details not disclosed in the storage medium and device embodiments of the present disclosure, reference is made to the description of the method embodiments of the present disclosure.

It should be understood that reference throughout the specification to "one embodiment" or "an embodiment" means that a particular feature, structure, or characteristic associated with the embodiment is included in at least one embodiment of the present disclosure. Thus, the appearances of & "in one embodiment" or "in an embodiment" in various places throughout the specification do not necessarily refer to the same embodiment. Furthermore, these specific features, structures, or characteristics may be combined in any suitable manner in one or more embodiments. It is to be understood that, in the various embodiments of the present disclosure, the magnitude of the sequence numbers of the processes described above is not meant to mean the order of execution, and the order of execution of the processes should be determined by their function and intrinsic logic, and should not be construed as any limitation on the implementation of the embodiments of the present disclosure. The above-described embodiment numbers of the present disclosure are for description only and do not represent the advantages or disadvantages of the embodiments.

It is to be noted that, in this disclosure, the terms "includes", "including" or any other variation thereof, are intended to cover a non-exclusive inclusion, such that a process, method, article, or device that includes a list of elements includes not only those elements but also other elements not expressly listed, or also includes elements inherent to such process, method, article, or device. Without more limitations, an element is defined by the statement "including a . . . " that does not rule out there are additional identical elements in a process, method, article, or apparatus that includes the element.

In several embodiments provided by the present disclosure, it should be understood that the disclosed devices and methods can be realized in other ways. For example, the embodiment of the device described above is only schematic. For example, the division of the unit is only a logical function division, and there can be another division method in actual implementation, for example, multiple units or components can be combined or integrated into another system, or some features can be ignored or not implemented. On the other hand, the mutual coupling or direct coupling or communication connection illustrated or discussed can be indirect coupling or communication connection through some interfaces, devices or units, and can be electric, mechanical or other forms.

The unit described as a separation part may or may not be physically separated, and the unit displayed as a unit may or may not be a physical unit, that is, it may be located in one place, or it may be distributed to multiple network units. Some or all of the units can be selected according to the actual needs to achieve the purpose of the embodiment.

In addition, each functional unit in each embodiment of the present disclosure may be integrated in one processing unit, each unit may exist physically alone, or two or more units may be integrated in one unit; the integrated unit may be implemented in the form of hardware or in the form of the combination of the hardware and software functional units.

It will be appreciated by those of ordinary skill in the art that all or a portion of the operations of the above-described method embodiments may be implemented by means of hardware associated with program instructions. The above-described program may be stored in a computer-readable storage medium. The program, when executed, performs the operations of the above-described method embodiments. The storage medium includes a removable storage device, a Read Only Memory (ROM), a magnetic disk, or an optical disk and other media that can store program codes.

Alternatively, the integrated unit described above may be stored in a computer-readable storage medium if implemented as a software functional module and sold or used as an independent product. Based on such an understanding, the technical solution of the embodiments of the present disclosure, in essence or in part contributing to the related art, may be embodied in the form of a software product, which is stored in a storage medium, includes instructions for causing a video coding apparatus to perform all or part of the methods described in the various embodiments of the present disclosure. The aforementioned storage media include: U disk, mobile hard disk, read-only memory (ROM), random access memory (RAM), disk or optical disk and other media that can store program code.

The above is only the specific embodiments of the disclosure, but the scope of protection of the disclosure is not limited to this. Any person skilled in the technical field who can easily think of change or replacement within the technical scope of the disclosure shall be covered in the scope of protection of the disclosure. Therefore, the protection scope of the disclosure shall be subject to the protection scope of the claims.

INDUSTRIAL APPLICABILITY

In an embodiment of the present application, an method for intra prediction is provided, a previously reconstructed block set corresponding to a current processing block is obtained; a first prediction direction, that is signalled in a bitstream, corresponding to each previously reconstructed block in the previously reconstructed block set is determined (i.e., a known candidate prediction direction of the current processing block, to obtain a first prediction mode set; if the first prediction mode set includes at least two directional modes, each of the directional modes is added into the first prediction direction set as a first prediction direction; vector operation is performed, according to a preset vector operation rule, on any two or more first prediction directions in the first prediction direction set to obtain a second prediction direction set (it can be understood that the second prediction direction in the second prediction direction set is a new candidate prediction direction of the current processing block); the second prediction direction set is combined with the first prediction mode set to obtain a second prediction mode set, intra prediction is performed on the current processing block based on the second prediction mode set.

In this way, a new candidate prediction direction is constructed by performing a vector operation on two or more known candidate prediction directions, that is, the second prediction direction set is combined with the first prediction mode set to obtain the second prediction mode set, and intra prediction is performed on the current processing block based on the second prediction mode set, so that the possibility of obtaining a sufficiently accurate prediction effect can be increased.

The invention claimed is:

1. A method for intra prediction, applied to an encoder, the method comprising:
   obtaining multiple previously reconstructed neighbouring blocks corresponding to a current processing block;
   determining prediction modes, that are signalled in a bitstream, corresponding to neighbouring blocks of the multiple previously reconstructed neighbouring blocks, to obtain multiple first prediction modes, wherein the first prediction modes include at least two directional modes;
   performing, according to a preset operation rule, operation on multiple first prediction directions with different directions among the multiple first predication directions;
   determining second prediction directions according to a result of the operation and a preset offset which is at least one of +1, −1, +2 or −2;
   obtaining a prediction mode set according to the second prediction directions and the multiple first prediction modes; and
   performing intra prediction on the current processing block based on the prediction mode set.

2. The method of claim 1, wherein performing intra prediction on the current processing block based on the prediction mode set comprises:
   obtaining a third prediction direction based on the prediction mode set, and performing intra prediction on the current processing block according to the third prediction direction to obtain a prediction value of a sample in the current processing block corresponding to the third prediction direction;
   determining a residual value between the prediction value of the sample in the current processing block and an original value of the sample; and
   signalling the third prediction direction and the residual value in a bitstream of the current processing block.

3. The method of claim 1, wherein performing, according to the preset operation rule, operation on multiple first prediction directions with different directions among the multiple first predication directions to obtain the second prediction directions comprises:
   performing operation on one or more of: multiple first prediction directions with different directions among the multiple first predication directions, a maximum of the multiple first prediction directions with different directions, or a minimum of the multiple first prediction directions with different directions, and determining the second prediction directions according to the result of the operation and the preset offset which is at least one of +1, −1, +2 or −2.

4. The method of claim 1, wherein the first prediction directions comprise a luma intra prediction direction.

5. The method of claim 1, wherein the neighbouring blocks are a left neighbouring block and an above neighbouring block of the current processing block.

6. A method for intra prediction, applied to a decoder, the method comprising:
   obtaining multiple previously reconstructed neighbouring blocks corresponding to a current processing block;
   obtaining multiple first prediction modes according to prediction modes of neighbouring blocks of the multiple previously reconstructed neighbouring blocks, wherein the first prediction modes include at least two directional modes;
   performing, according to a preset operation rule, operation on multiple first prediction directions with different directions among the multiple first predication directions;
   determining second prediction directions according to a result of the operation and a preset offset which is at least one of +1, −1, +2 or −2;
   obtaining a prediction mode set according to the second prediction directions and the multiple first prediction modes; and
   performing intra prediction on the current processing block based on the prediction mode set.

7. The method of claim 6, wherein performing intra prediction on the current processing block based on the prediction mode set:
   determining a prediction value of a sample in the current processing block; and
   obtaining a reconstruction value of the sample according to the predication value and a residual value of the sample in the current processing block, the residual value being parsed from a bitstream.

8. The method of claim 6, wherein performing, according to the preset operation rule, operation on multiple first prediction directions with different directions among the multiple first predication directions to obtain the second prediction directions comprises:
   performing operation on one or more of: multiple first prediction directions with different directions among the multiple first predication directions, a maximum of the multiple first prediction directions with different directions, or a minimum of the multiple first prediction directions with different directions, and determining the second prediction directions according to the result of the operation and the preset offset which is at least one of +1, −1, +2 or −2.

9. The method of claim 6, wherein the first prediction directions comprise a luma intra prediction direction.

10. The method of claim 6, wherein the neighbouring blocks are a left neighbouring block and an above neighbouring block of the current processing block.

11. A decoder comprising a memory and a processor, the memory storing instructions executable on the processor, wherein the processor, when executing the instructions, perform operations of:
    obtaining multiple previously reconstructed neighbouring blocks corresponding to a current processing block;
    obtaining multiple first prediction modes according to prediction modes of neighbouring blocks of the multiple previously reconstructed neighbouring blocks, wherein the first prediction modes include at least two directional modes;
    performing, according to a preset operation rule, operation on multiple first prediction directions with different directions among the multiple first predication directions;

determining second prediction directions according to a result of the operation and a preset offset which is at least one of +1, −1, +2 or −2;

obtaining a prediction mode set according to the second prediction directions and the multiple first prediction modes; and performing intra prediction on the current processing block based on the prediction mode set.

12. The decoder of claim 11, wherein performing intra prediction on the current processing block based on the prediction mode set:

determining a prediction value of a sample in the current processing block; and obtaining a reconstruction value of the sample according to the predication value and a residual value of the sample in the current processing block, the residual value being parsed from a bitstream.

13. The decoder of claim 11, wherein performing, according to the preset operation rule, operation on multiple first prediction directions with different directions among the multiple first predication directions to obtain the second prediction directions comprises:

performing operation on one or more of: multiple first prediction directions with different directions among the multiple first predication directions, a maximum of the multiple first prediction directions with different directions, or a minimum of the multiple first prediction directions with different directions, and determining the second prediction directions according to the result of the operation and the preset offset which is at least one of +1, −1, +2 or −2.

14. The decoder of claim 11, wherein the first prediction directions comprise a luma intra prediction direction.

15. The decoder of claim 11, wherein the neighbouring blocks are a left neighbouring block and an above neighbouring block of the current processing block.

* * * * *